United States Patent Office 3,281,359
Patented Oct. 25, 1966

3,281,359
NEOPENTYL POLYOL DERIVATIVES AND
LUBRICATING COMPOSITIONS
Frederick G. Oberender, Wappingers Falls, and David D.
Reed, Glenham, N.Y., James M. Petersen, Erie, Pa.,
and Herman D. Kluge, deceased, late of Fishkill, N.Y.,
by Hazel E. Kluge, administratrix, Fishkill, N.Y., assignors to Texaco Inc., New York, N.Y., a corporation
of Delaware
No Drawing. Filed Aug. 27, 1964, Ser. No. 392,603
15 Claims. (Cl. 252—46.6)

This invention relates to novel derivatives of neopentyl polyols and polyolefinic-$P_2S_5$ products. More particularly, the subject invention pertains to derivatives of neopentyl polyols and inorganic phosphorus acid free, hydrolyzed reaction product of a polyolefin and $P_2S_5$. The invention further relates to the preparation of the derivatives and to lubricants containing said derivatives.

The neopentyl polyol derivatives of the invention have demonstrated usefulness as detergent-dispersant additives in lubricating oil, particularly petroleum lubricating oil.

The derivatives of the invention have been found to have superior thermal stability over other types of closely related derivatives of hydrolyzed polyolefin-$P_2S_5$ reaction products. Thermal stability is important in the lubricant additive field since lubricant additives of relatively poor thermal stability break down in high temperature engine operation forming corrosive decomposition products which in turn cause increased engine wear.

The derivatives of neopentyl polyols contemplated herein are prepared as follows:

A polyolefin-$P_2S_5$ reaction product is first prepared. The polyolefinic hydrocarbon reactant usually contains at least 12 carbon atoms although lower molecular weight olefins can be employed. Aliphatic hydrocarbon monoolefinic polymers such as polyethylene, polypropylene, polyisopropylene, polyisobutylene, polybutene, and copolymers of monoolefins such as propylene-isobutylene copolymers are examples of the monoolefinic polymers contemplated herein. In general, monoolefinic polymers and copolymers having an average molecular weight of between about 250 and 50,000 are employed with polymers and copolymers having an average molecular weight in the range from 600 to 5,000 being particularly preferred. Copolymers of conjugated dienes and monoolefins such as copolymer of butadiene and isobutylene having an average molecular weight in the above prescribed ranges are also contemplated. Particularly preferred olefin polymers are the monoolefinic polyisobutylene polymers having an average molecular weight between 600 and 5,000.

The polyolefin is reacted with $P_2S_5$ (about 5–40 wt. percent of the reaction mass) at a temperature from about 100 to about 320° C. in the presence of between about 0.1 and 5.0 wt. percent sulfur. This reaction is normally conducted for a period of between about 1 and 10 hours. The reaction mixture if not in a liquid state is placed in a liquid state under preferred conditions. The liquefaction is accomplished by diluting the reaction mixture with a mineral lubricating oil having an SUS viscosity at 100° F. between about 50 and 1000. The lubricating oil usually constitutes between about 25 and 75 wt. percent of the diluted reaction product concentrate.

The mineral oil diluted or undiluted polyolefinic-$P_2S_5$ reaction product is then hydrolyzed by contacting with steam at a temperature desirably between about 100 and 260° C. Under advantageous conditions, at least about one mole of steam is employed per mole of reaction product and the hydrolysis is conducted for a period of 1 to 20 hours. Inorganic phosphorus acids are formed during the hydrolysis, and they are removed by standard procedure. A number of different procedures are available for removal of the inorganic phosphorus acids. In U.S. 2,951,835 and 2,987,512 removal of the inorganic phosphorus acid is effected by contact with synthetic anhydrous alkaline earth metal silicates and synthetic anhydrous alkali metal silicates, respectively. Commonly assigned, copending application, Serial No. 841,668, now U.S. 3,135,-729, describes a process where inorganic phosphorus acids are removed from the hydrolyzed product by first drying the hydrolyzed product by passing an inert gas such as nitrogen therethrough at between about 120 and 200° C. and then contacting the inorganic acids with anhydrous methanol under mixing conditions at a temperature between about 40 and 80° C. in a methanol amount of between about 30 and 80 volume percent based on the overall mixture thereby forming an extract phase containing inorganic phosphorus acid and a mineral oil raffinate phase containing inorganic phosphorus acid free, steam hydrolyzed $P_2S_5$-polyolefin reaction product. During the extraction procedure superatmospheric pressure may be applied, e.g., up to about 50 p.s.i.g. in order to maintain the methanol in the liquid state. At the end of the extraction step any methanol carried over into raffinate phase is preferably removed, e.g., by stripping the riffinate with an inert gas at an elevated temperature.

The inorganic phosphorus acid free, hydrolyzed polyolefin-$P_2S_5$ reaction product is then contacted with a neopentyl polyol of the formula:

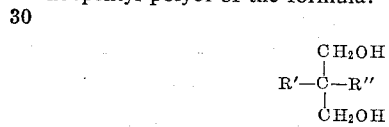

where R' and R" are members selected from the group consisting of alkyl and alkylol of from 1 to 20 carbons at a temperature between about 180 and 220° C. in a mole ratio of neopentyl polyol to hydrolyzed reaction product of between about 0.33:1 and 2:1. This reaction is normally conducted for a period of 1 to 10 hours. The resulting product is believed to be primarily a complex mixture of hydrocarbon phosphorus acid monoesters, diesters, polyesters, cyclicesters and anhydrides.

Under preferred conditions, the esterification reaction is continued until the total acid number (TAN) of the reaction mixture falls below about 5. To obtain this TAN level normally the removal of between about 1.0 to 1.4 moles of water by-product per mole of hydrolyzed $P_2S_5$-polyolefin reaction product is required. Method of determining TAN values is described in ASTM test D 664–54.

Further, under preferred conditions a liquid agent is present which forms an azeotrope with water to facilitate continuous water by-product removal during the neopentyl polyol esterification reaction. It is normally present in a volume amount of between about 5 and 40%. Specific examples of azeotroping agents contemplated herein are xylene, benzene, toluene and isooctane and any other inert liquid hydrocarbon which forms an azeotrope with water that distills during the esterification reaction.

Specific examples of the neopentyl polyol reactants contemplated herein are pentaerythritol, trimethylolpropane, trimethylolethane, trimethylolbutane and neopentylglycol 2-methyl-2-ethyl-1,3-propanediol, 2,2-didecyl-1,3-propanediol and 5,5-dimethylolhexanol.

If desired, the neopentyl polyol derivative of the invention may have its odor reduced for better consumer acceptance. This is accomplished by the method set forth in coassigned, copending application, Serial No. 392,640, filed August 27, 1964. In said method nitrogen dioxide or a mixture of nitrogen dioxide and oxygen alternatively diluted with an inert gas such as nitrogen is contacted, e.g., bubbled through, with the derivative at a temperature between about 65 and 150° C. until at least about 0.15 wt. percent nitrogen dioxide and preferably less than about 0.22 wt. percent $NO_2$ is absorbed by the derivative based on the weight of the derivative. Under advantageous conditions nitrogen dioxide is diluted with air or an inert gas such as nitrogen carbon dioxide, and the like containing about 1 vol. percent or more of nitrogen dioxide. Advantageously the reactive gas is introduced into the polyol derivative at a rate of between about 0.001 to 0.5, preferably between about 0.01 and 0.02, standard cubic feet (s.c.f.)/pound (lb.) of derivative/hour. As pointed out in the copending application, after the oxide of nitrogen treatment the residual oxides of nitrogen are removed by stripping with a relatively inert gas such as nitrogen or air.

In the lubricating oil compositions containing the polyol derivatives of the invention, hydrocarbon mineral oil may be employed as the base material, such as paraffin base, naphthene base or mixed paraffin base distillate or residual oils. Paraffin base distillate lubricating oil fractions are used in the formulation of premium grade motor oil such as contemplated in this invention. The lubricating mineral oil base generally has been subjected to solvent refining to improve its lubricity and viscosity-temperature relationship as well as solvent dewaxing to remove waxy components and improve the pour of the oil. Broadly speaking, a mineral lubricating oil having an SUS viscosity at 100° F. between about 50 and 1000 may be used in the formulation of the improved lubricants of this invention. Usually the viscosity range falls between 70 and 300 at 100° F.

Synthetic lubricating bases of the ester or ether type may also be used as the lubricating base oil. High molecular weight, high boiling liquid aliphatic dicarboxylic esters and polyphenyl ethers possess excellent viscosity-temperature relationships and lubricating properties and are finding ever-increasing utilization in lubricating oils adapted for high and low temperature lubrications. Esters and ethers of this type are used in the formulation of jet engine oils. Specific examples of synthetic ester lubricating oils are found in U.S. Patent Nos. 2,628,974 and 2,723,286. Specific examples of synthetic ether lubricating oils are described in "Lubrication," vol. 45, No. 11, p. 150 published by Texaco Inc.

The neopentyl polyol derivatives of the invention are present in lubricating oils in concentrations sufficient to impart detergent-dispersant properties thereto. In concentrations used in the formulation of finished lubricant, the concentration of the derivative can be as high as 50%. In finished lubricants the concentration of the additive falls between about 0.2 and 10 wt. percent with a concentration of between 1 and 5 wt. percent normally employed.

The mineral lubricating oils containing the derivatives of the invention usually contain other additives designed to impart other desirable properties thereto. For example, VI improvers such as polymethacrylates are normally included therein as are corrosion inhibitors and other detergents. A widely used VI improver is polymethacrylate having the general formula:

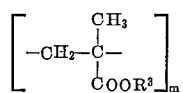

where $R^3$ is an aliphatic radical of from 1 to 20 carbons and $m$ is an integer between 600 and 35,000.

Another commonly used supplementary lube oil additive is an alkaline earth metal alkyl phenolate. Barium nonylphenolate, barium dodecylcresolate and calcium dodecylphenolate are examples of such detergents. These products which are well known detergent additives are usually present in the lubricating oil in a concentration between about 0.1 and 5 wt. percent.

The most commonly used supplementary lube oil inhibitor and antioxidant is a divalent metal dialkyl dithiophosphate resulting from neutralization of a $P_2S_5$-alcohol reaction product with a divalent metal or divalent metal oxide. Barium and zinc dialkyl dithiophosphates are widely used oxidation and corrosion inhibitors. Metal dialkyl dithiophosphates are usually present in the lubricant in a concentration between about 0.1 and 3 wt. percent.

The following examples further illustrate the invention but are not to be taken as limitations thereof.

*Example I*

This example illustrates the preparation of inorganic acid free, hydrolyzed polyolefin-$P_2S_5$ reactant from which the polyol reaction products are derived.

To 400 pounds of polyisobutene of an average molecular weight of about 1100, there is added 79.3 pounds of $P_2S_5$ and 4.0 pounds of elemental sulfur. The reaction mixture is heated under a blanket of nitrogen at a temperature of 232° C. for a period of 6 hours. At the end of the reaction period the resultant polyisobutene-$P_2S_5$ reaction mixture is diluted with 620 pounds of mineral oil of an SUS viscosity of 100 at 100° F. The resultant lube oil concentrate of the reaction mixture is hydrolyzed by bubbling steam therethrough at a temperature of 176° C. The steam contact continued for a period of about 10 hours at a steam rate of about 10 lb./hr.

To 1084 pounds of steam hydrolyzed polyisobutene-$P_2S_5$ reaction product there is added, under mixing conditions, 466 pounds of anhydrous methanol at about 60° C. for a period of about 6 hours in order to extract into the methanol phase any inorganic phosphorus acids formed during the previous steam hydrolysis step. At the end of the methanol treating period the mixture is allowed to settle and methanol phase is decanted therefrom, leaving an oil raffinate phase of a Neut. No. of about 20, containing an inorganic acid free, steam hydrolyzed polyisobutene (1100 m.w.)-$P_2S_5$ reaction product.

*Example II*

This example illustrates the preparation of a $NO_2$ treated neopentyl polyol derivative of the invention.

One hundred pounds of the oil phase of the type prepared in Example I containing the inorganic acid free, steam hydrolyzed polyisobutene (1100 m.w.)-$P_2S_5$ reaction product is mixed with 4.25 lbs. of trimethylolpropane and 18 lbs. xylene. The resultant mixture is heated in a range of 180 to 212° C. for a period of 4 hours, the water by-product and xylene being continuously removed as an azeotropic distillate and the xylene recycled to the reaction vessel. At the end of the reaction period the residual xylene is removed by stripping with nitrogen at a temperature of 93 to 160° C. under a pressure of 20 mm. Hg. During the esterification and xylene stripping steps with nitrogen, a total of 0.82 lb. of water are recovered which is equivalent to a total of 1.44 moles of water per mole of initial inorganic acid free, hydrolyzed polyisobutene-$P_2S_5$ reaction product.

After the nitrogen stripping, the trimethylolpropane reaction product has bubbled therethrough a mixture of nitrogen dioxide and diluent nitrogen at a flow rate of 100 mls./minute for a period of 1 hour at a temperature of 125° C. At the end of the nitrogen dioxide treatment nitrogen is then bubbled through the reaction product at a rate of 100 mls./minute to remove any residual nitrogen dioxide. The total amount of nitrogen dioxide absorbed by the trimethylolpropane derivative is 0.2 wt. percent based on the derivative.

Physical tests on the NO₂ treated, trimethylolpropane derivative reaction mixture gave the following results:

Hydroxyl No. _____ 15.0
Total Acid No. _____ 5.4
Phosphorus, wt. percent _____ 1.1
Sulfur, wt. percent _____ 0.56

*Example III*

This example illustrates the preparation of the non-NO₂ treated neopentyl polyol derivative of the invention.

To a reaction flask there is added 1475 grams of an oil phase product of the type prepared in Example I having a Neut. No. of about 19 containing 0.5 mole of an inorganic phosphorus acid free, steam hydrolyzed polyisobutene (1100 m.w.)-P₂S₅ reaction product, together with 67 grams (0.5 mole) trimethylolpropane and 400 mls. of xylene. The reactants are heated to reflux (180–196° C.) and 9.5 mls. of water are collected during the 3-hour reflux period. The product is stripped to 204° C. on a water aspirator yielding 1429 grams of the trimethylolpropane derivative of the inorganic phosphorus acid free, steam hydrolyzed polybutene (1100 m.w.)-P₂S₅ reaction product. Analysis of the trimethylolpropane derivative oil phase finds it to have a Neut. No. of 3.2, hydroxyl number of 23, a TAN of 4.54, 1.1 wt. percent phosphorus and 0.68 wt. percent sulfur.

*Example IV*

This example illustrates the preparation of the pentaerythritol derivative of the inorganic phosphorus acid free, steam hydrolyzed polyolefin-P₂S₅ reaction product.

To a reaction flask there is added 698 grams of an oil phase product of the type prepared in Example I having a Neut. No. of 19 containing 0.25 mole of inorganic phosphorus acid free, steam hydrolyzed, polyisobutene (1100 m.w.)-P₂S₅ reaction product, together with 34 grams (0.25 mole) of pentaerythritol and 175 mls. of xylene. The mixture is heated to reflux and reflux is continued 8 hours at 193°–208° C. During this period 8 mls. of water is removed from the system. At the end of the 8-hour period the reaction mixture is cooled, diluted with pentane filtered and stripped to 400 F. on a water aspirator to dry the product. The oil phase containing the pentaerythritol derivative weighs 7.12 grams and has a Neut. No. of 2.3, a hydroxyl No. of 15, a TAN of 2.8; wt. percent P=1.1 and wt. percent S=0.62.

*Example V*

This example illustrates the preparation of a neopentyl glycol derivative of the inorganic acid free, steam hydrolyzed polyolefin-P₂S₅ reaction product.

To a 2-liter reaction flask equipped with a water trap and condenser there is charged 1715 grams of an oil phase product of the type prepared in Example I having a Neut. No. of 16.5 containing 0.5 mole of inorganic acid free steam hydrolyzed polyisobutene (1100 m.w.)-P₂S₅ reaction product together with 250 mls. of xylene. The mixture is heated at reflux to dry the reactants for a period of 5 hours. Fifty-three grams (0.5 mole) of neopentyl glycol is then added to the reaction flask, and the reaction mixture is heated to reflux (194–226° C.) for a period of 6.5 hours and 19.5 mls. of water are collected. The residual oil phase containing the neopentyl glycol derivative has a Neut. No. of 3.41, a Hydroxyl No. of 2, a TAN of 6.17, a 1.1 wt. percent phosphorus and 0.60 wt. percent sulfur content.

*Example VI*

This example illustrates the use of the derivatives of the invention as detergent-dispersant additives in mineral oil.

The neopentyl polyol derivatives of the type prepared in Examples II and III are tested in the well known CLR Sludge Test. The compositions employed in the test are of the following component makeup:

| Description | A | B |
|---|---|---|
| Refined paraffinic distillate oil, wt. percent (SUS visc. at 100° F. equivalent to 100) | 81.83 | 81.83 |
| Derivative product of Example II | 7.50 | |
| Derivative product of Example III | | 7.50 |
| Barium C₁₂ aklyl phenolate, wt. percent | 2.41 | 2.41 |
| Zinc isopropyl 1,3-dimethylbutyl dithiophosphate, wt. percent | 1.80 | 1.80 |
| Mineral oil concentrate containing 25 wt. percent of a copolymer of a mixed methacrylate alkyl ester in which the alkyl group ranges from butyl to octadecyl, wt. percent | 1.96 | 1.96 |
| CO₂ neutralized sulfurized basic barium sulfonate, wt. percent | 4.50 | 4.50 |
| Dimethyl silicone antifoam concentrate, p.p.m. | 150 | 150 |

The CLR engine test results for the above formulations are as follows:

| | Sludge Rating [1] | |
|---|---|---|
| | A | B |
| Time, Hrs.: | | |
| 70 | 9.4 | 9.2 |
| 94 | 8.5 | 8.9 |
| 110 | 8.6 | 9.0 |
| Piston Varnish [1] | 8.0 | 8.1 |
| Oil Screen Plugging, Percent | 0 | 0 |

[1] No Sludge=10 Rating.

*Example VII*

This example illustrates the superiority of the neopentyl polyol derivatives of the invention over closely related derivative products. The test employed determines the thermal stability of the derivative, that is, the resistance of the derivative to decomposition under engine operating conditions and therefore, its ability to continue to function as a detergent-dispersant in lube oils. The thermal stability comprises heating the derivative to a temperature of 300° F. and measuring the change in total acid number (TAN) of the derivative at various time intervals during a 72 hour period. The greater the change in total acid number, the greater the decomposition of the derivative product under engine operating conditions. Six materials are tested and are described as follows:

(1) Composition A is the trimethylol propane derivative containing oil phase of the type prepared in Example III.

(2) Composition B is prepared in the manner of Example III except trimethylol ethane is substitute for trimethylol propane.

(3) Composition C is prepared in the manner of Example III except ethylene oxide is substituted for trimethylol propane and the reaction between the inorganic phosphorus acid free, steam hydrolyzed polybutene (1100 m.w.)-P₂S₅ reaction product, and ethylene oxide is conducted at about 130° C.

(4) Composition D is prepared in the manner of Composition C except a reaction temperature of 177° C. is employed.

(5) Composition E is prepared in the manner of Example III except glycidol is substituted for trimethylolpropane and the glycidol derivative is prepared at about 121° C.

(6) Composition F is prepared in the manner of Composition E except the glycidol derivative is prepared at about 177° C.

In respect to the above six compositions, Compositions A and B are examples of derivatives of the invention and Compositions C, D E and F are comparative compositions. The test results are reported in the table below:

THERMAL STABILITY IN TOTAL ACID NUMBER

| Composition | Initial | 24 hrs. | 48 hrs. | 72 hrs. |
|---|---|---|---|---|
| A | 5.1 | 5.5 | 6.3 | 8.1 |
| B | 5.0 | 6.8 | 7.2 | 7.9 |
| C | 1.8 | 12.8 | 20.6 | 25.3 |
| D | 6.3 | 12.1 | 17.2 | 20.0 |
| E | 5.4 | 14.4 | 17.4 | 16.6 |
| F | 6.6 | 13.4 | 17.2 | 18.4 |

As can be seen from the above table the derivatives of the invention as represented by Compositions A and B are materially more thermally stable than closely related comparative Compositions C–F.

We claim:
1. A method of preparing a detergent-dispersant polyol derivative comprising:
 (a) contacting an aliphatic polyolefin of an average molecular weight between about 250 and 50,000 with $P_2S_5$ in the presence of between about 0.1 and 5 wt. percent sulfur at a temperature of between about 100 and 320° C., $P_2S_5$ comprising between about 5 and 40 wt. percent of the reaction mixture,
 (b) contacting the resultant polyolefin-$P_2S_5$ reaction product with steam at a temperature between about 100 and 260° C. utilizing at least about a mole ratio excess of steam in respect to said polyolefin-$P_2S_5$ reaction product,
 (c) removing inorganic phosphorus acid from the steam treated polyolefin-$P_2S_5$ reaction product,
 (d) contacting the inorganic acid free, steam hydrolyzed polyolefin-$P_2S_5$ reaction product with a neopentyl polyol of the formula:

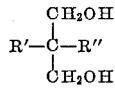

where R′ and R″ are selected from the group consisting of alkylol and alkyl of from 1 to 20 carbons at a temperature between about 180 and 220° C. in a mole ratio of said inorganic phosphorus acid free, steam hydrolyzed $P_2S_5$-polyolefin reaction product to said polyol of between about 1:0.33 and 1:2 to form said polyol derivative.

2. A method in accordance with claim 1 wherein the polyolefin-$P_2S_5$ reaction mixture of said "a" step, prior to contact with steam in said "b" step, is diluted with a mineral lubricating oil of an SUS viscosity between about 50 and 1000 to form a diluted polyolefin-$P_2S_5$ reaction mixture having a mineral lubricating oil content of between about 25 and 75 wt. percent and contacting the resultant lubricating oil solution in accordance with said "b," "c" and "d" steps.

3. A method in accordance with claim 2 wherein said polyolefin is polyisobutene of a molecular weight of about 1100 and said polyol is trimethylol propane.

4. A method in accordance with claim 2 wherein said polyolefin is polyisobutene of an average molecular weight of about 1100 and said polyol is pentaerythritol.

5. A method in accordance with claim 2 wherein said polyolefin is polyisobutene of an average molecular weight of about 1100 and said polyol is neopentyl glycol.

6. A polyol derivative prepared in accordance with claim 1.

7. A poly derivative prepared in accordance with claim 2.

8. A polyol derivative prepared in accordance with claim 3.

9. A polyol derivative prepared in accordance with claim 4.

10. A polyol derivative prepared in accordance with claim 5.

11. A lubricating oil composition comprising a major amount of lubricant oil and an effective detergent-dispersant amount of a polyol derivative prepared in accordance with claim 1, said lubricating oil selected from the group consisting of mineral lubricating oil, synthetic ester lubricating oil and synthetic ether lubricating oil.

12. A lubricating oil composition comprising a major amount of lubricant oil and an effective detergent-dispersant amount of a polyol derivative prepared in accordance with claim 2, said lubricating oil selected from the group consisting of mineral lubricating oil, synthetic ester lubricating oil and synthetic ether lubricating oil.

13. A lubricating oil composition comprising a major amount of lubricant oil and effective detergent-dispersant amount of a polyol derivative prepared in accordance with claim 3, said lubricating oil selected from the group consisting of mineral lubricating oil, synthetic ester lubricating oil and synthetic ether lubricating oil.

14. A lubricating oil composition comprising a major amount of lubricant oil and an effective detergent-dispersant amount of a polyol derivative prepared in accordance with claim 4, said lubricating oil selected from the group consisting of mineral lubricating oil, synthetic ester lubricating oil and synthetic ether lubricating oil.

15. A lubricating oil composition comprising a major amount of lubricant oil and an effective detergent-dispersant amount of a polyol derivative prepared in accordance with claim 5, said lubricating oil selected from the group consisting of mineral lubricating oil, synthetic ester lubricating oil and synthetic ether lubricating oil.

References Cited by the Examiner

UNITED STATES PATENTS 2,767,163   10/1956   Peters _____ 260—139

FOREIGN PATENTS 838,928   6/1960   Great Britain.

DANIEL E. WYMAN, *Primary Examiner.*

L. G. XIARHOS, *Assistant Examiner.*